G. F. BROWN.
GRAIN BIN.
APPLICATION FILED MAY 11, 1915.
1,275,157.
Patented Aug. 6, 1918.
3 SHEETS—SHEET 1.
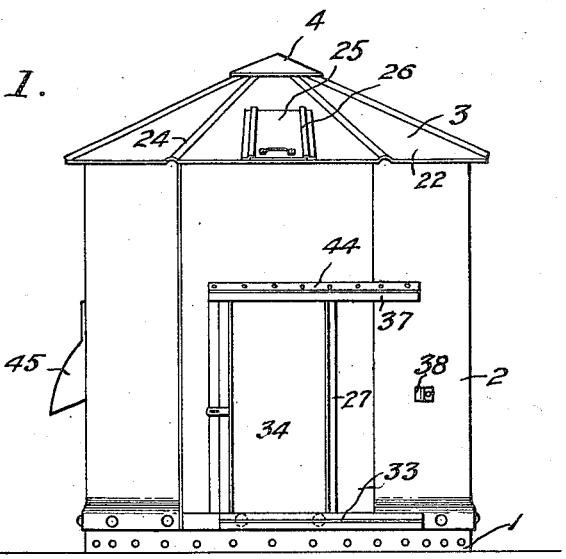
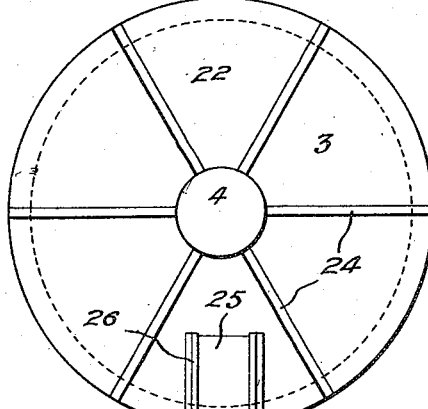
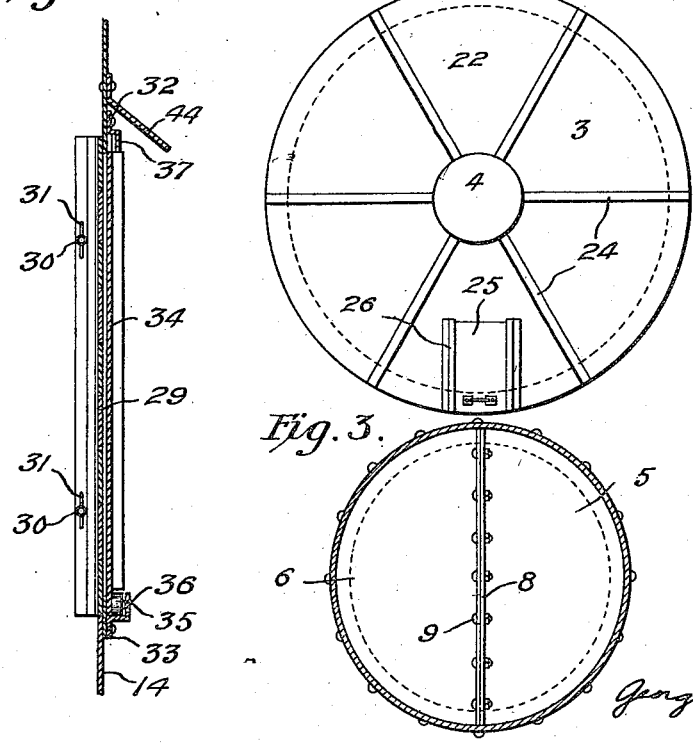
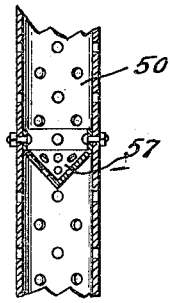
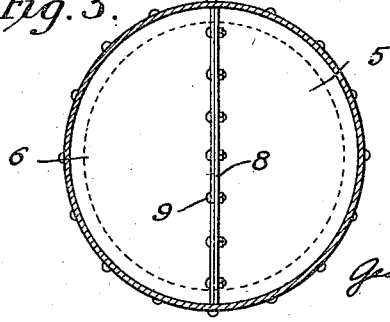
George F. Brown, Inventor
By Edson Bros.
Attorneys

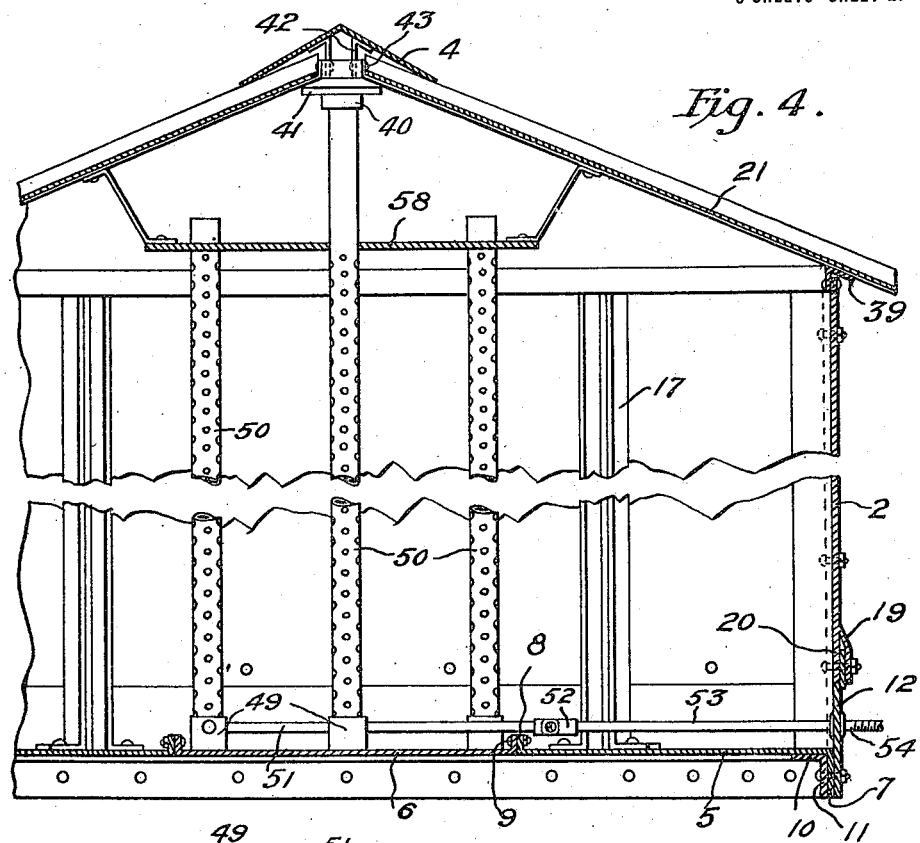
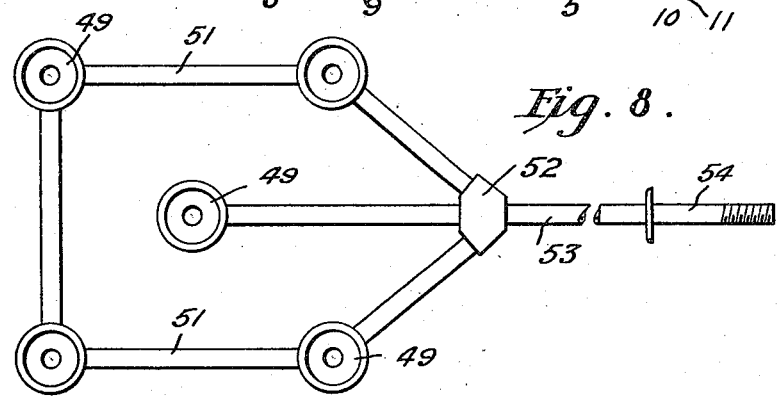
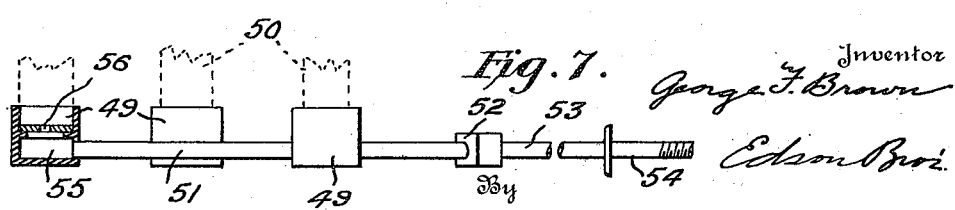

G. F. BROWN.
GRAIN BIN.
APPLICATION FILED MAY 11, 1915.
1,275,157.
Patented Aug. 6, 1918.
3 SHEETS—SHEET 3.
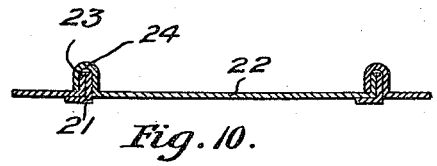
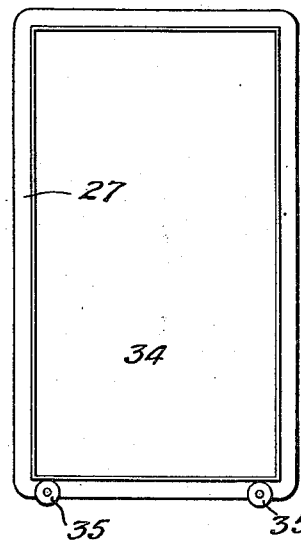
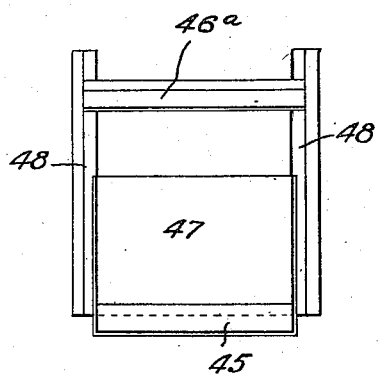
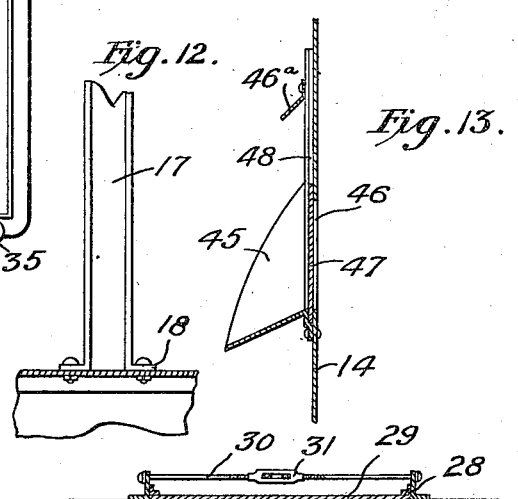
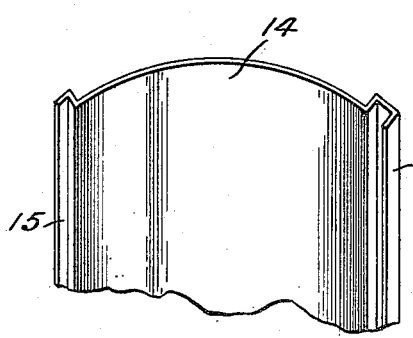

UNITED STATES PATENT OFFICE.

GEORGE F. BROWN, OF ST. CLOUD, MINNESOTA, ASSIGNOR TO THE INTERNATIONAL PATENT INVESTMENT COMPANY, OF FARGO, NORTH DAKOTA, A CORPORATION OF NORTH DAKOTA.

GRAIN-BIN.

1,275,157.  Specification of Letters Patent.  Patented Aug. 6, 1918.

Application filed May 11, 1915. Serial No. 27,447.

*To all whom it may concern:*

Be it known that I, GEORGE F. BROWN, a citizen of the United States, residing at St. Cloud, in the county of Stearns and State of Minnesota, have invented certain new and useful Improvements in Grain-Bins; and I do hereby declare the following to be a full, clear, and exact description of the invention, such as will enable others skilled in the art to which it appertains to make and use the same.

This invention is a grain bin having for its purpose to store loose materials such as grain and like substances, in a compartment which will be moisture proof, vermin proof and fire proof.

The bin is designed with especial reference to ventilating the interior of the structure and is susceptible for use in storing miscellaneous articles, such as farm implements, when not in use as a grain bin.

While a preferred embodiment of the invention is illustrated in the accompanying drawings, it is to be understood that the construction therein shown is for the purposes of illustration only, and not as defining the limits of the invention.

In the drawings:

Figure 1 is a side elevation of a bin constructed in accordance with my invention.

Fig. 2 is a plan view of the same.

Fig. 3 is a plan view of a floor thereof.

Fig. 4 is a partial sectional view disclosing the manner of mounting the walls with relation to the floors.

Fig. 5 is a fragmentary view of one of the plates forming the wall of the bin.

Fig. 6 is a fragmentary view disclosing coöperating plates forming the roof.

Fig. 7 is a side elevation, partly in section, of the ventilating base.

Fig. 8 is a plan view of the ventilating base.

Fig. 9 is a vertical sectional view disclosing a deflector mounted within a ventilating tube.

Fig. 10 is a front elevation of a closure for the door opening in the wall of the bin.

Fig. 11 is a detail front elevation of the grain chute.

Fig. 12 is a detail view disclosing the mounting of one of the supporting studs secured to the floor.

Fig. 13 is a vertical sectional view disclosing the grain chute set forth in Fig. 11.

Fig. 14 is a horizontal section through the door to the bin and its frame.

The invention contemplates the construction of a metallic bin wherein the parts may be quickly and readily assembled into a rigid portable structure which will efficiently exclude moisture from the interior thereof, and wherein the contents of the structure may be thoroughly ventilated. It is well known that when grain is stored in large bins it is liable to become moldy from the effects of moisture contained within the closure. Accordingly the bin is provided with means whereby the moisture which may be contained by the material stored, may be conducted away from the bin or material. The ventilating means is removably mounted within the body of the bin.

The structure is adapted to be placed upon the ground, and the foundation thereof may be made in a plurality of sections which are adapted to be readily connected and separated, as occasion requires. The main body of the device is preferably composed of a plurality of metallic plates secured in a suitable manner to the studs which are supported by the foundation. The roof structure is preferably of a plurality of sections suitably mounted upon girders or rafters, and is interlocked with the girders so as to form a unitary structure associated with means coöperating with devices within the body for ventilating the interior of the bin. Suitable openings may be provided in the body and roof of the structure for access to the interior of the bin.

Referring more particularly to the construction illustrated in the drawings, the bin is shown comprising a foundation 1, side walls 2, a roof 3, and a ventilating dome 4.

The foundation is adapted to rest upon the ground without excavation, and comprises a floor which may be in a plurality of sections 5, 6. While only two sections are disclosed, it is obvious that any preferred number may be employed. Each section is shown provided with a downwardly directed flange 7 around the edge thereof, and may have an upwardly directed flange 8 which is adapted to abut against a similar flange of an adjacent floor section, and to be secured to said adjacent flange by any suitable means, such as the bolt 9. Associated with the floor may be an angle iron, one flange 10 of which is shown supporting the floor at the edge thereof, while the other flange 11 may serve as means to connect the flange to the downwardly directed flange 7 of the floor. Coöperating with the floor structure and the wall 2 is a rim plate 12, which is preferably of such width that it rests upon the ground and extends above the level of the floor. This rim plate is adapted to abut against the flange 7 of the floor, and any suitable means such as the bolts 13 may be employed to secure the angle iron flange 11, the floor at 7 and the rim plate 12, together. The wall of the bin is preferably composed of a plurality of plates 14, shown more particularly in Fig. 5. One edge of the plate may be formed with an angular flange 15, while the other edge thereof may be formed with the channel flange 16, whereby said plates are overlapping and interlocking when applied to the sides of the bin. The channeled edge of plate 14 is designed to overlap the angular edge 15 of the adjacent plate, and the wall 2 may be secured in position by passing suitable fastening means through the flange 15 of one plate and the channel 16 of the other, and thence through a suitable support such as a channeled stud 17, a plurality of which may be employed for the bin.

The studs for the bin are shown as channel members, with the lower ends thereof turned at an angle to the side walls as at 18 to serve as means to secure the same to the floor or any suitable supporting means. The studs are preferably mounted around the edge of the floor whereby their weight and the weight of the wall may be supported by the flanged edge 7 of the floor and by the iron 10, 11.

If desired, the wall 2 may have its plates provided with a bifurcated lower end as indicated in Fig. 4, and in this structure the lower edge of the plates may be bent outwardly as at 19, and a section 20 parallel therewith may be secured to the body of the plates to form the bifurcated lower edge and to receive the upper portion of the rim plate 12. Any suitable fastening means may be employed to secure the wall 2 to the rim plate, although it is obvious that fastening means may not be necessary at this part of the structure. Any number of plates may be employed to form the roof 3 of the bin. The plates are preferably interlocking, as illustrated in Fig. 6. The girders or rafters 21 for the roof are preferably angle irons. Each of the roof plates 22 is shown provided with one angular edge 23, while its opposite edge may be channeled as at 24. The angular edge of the plate 23 is adapted to be placed into abutting engagement with the upstanding flange of the channel iron forming the girder and to rest upon the horizontal flange of the girder or rafter. When the angular flange 23 is in such abutting position, the channeled edge 24 of an adjacent plate is adapted to be placed over the members 23, 21 and to be secured thereto by any suitable means, thereby making a roof which is water tight and substantial in construction. In one of the roof plates 22 there may be formed a suitable doorway closed by a sliding door 25 positioned between angular guides 26. This opening in the roof permits the bin to be filled from the top when the side doors and chutes have been closed.

In one of the wall sections or plates 13 a suitable door opening may be formed, and a door frame 27 (Fig. 10) may be secured to the wall section around the opening. The frame may be provided with angular members 28, Fig. 14, to receive drop boards 29 which may serve to hold the grain or other loose substance stored within the bin, away from the door opening. If desired, suitable tie rods 30 may be employed across the door opening associated with turn buckles 31 to retain the frame in position. This part of the frame may be on the inside of the bin. On the exterior surface of the door opening the frame may be provided with a plurality of angular bars 32, 33 shown more clearly in Fig. 1, the former being arranged at the top of the door opening and the latter at the bottom thereof. The door frame 27 may be provided with a suitable metal plate 34 which may be of a shape to conform to the general configuration of the frame and of the side of the bin. The plate 34 may be secured to the frame 27 in any suitable manner. To facilitate the movement of the door between the bars 32, and 33, there may be provided a plurality of rollers 35 which are shown mounted at the lower edge of the frame 27 and which are adapted to engage an angular member 36 of the lower bar 33, which serves to retain the door in position by engaging the rollers. This angular member serves as a track guide for the door. The upper bar 32 may be provided also with an overhanging flange portion 37 which serves to engage the upper portion of the door and retain it in position. If desired, a suitable stop 38 may be employed to limit the opening movement of the door beyond a predetermined point.

The roof structure is preferably supported from the walls of the bin, and for this purpose the upper part of the wall 2 may be provided with an angle iron 39 which serves as means upon which one end of the girder or rafter 21 may be mounted. The other end of the girder or rafter 21 may be secured in any suitable manner to a tubular central casting 40. This central casting 40 may be provided with a collar 41 on which the inner ends of the girders may be supported.

If desired, the conical hood 4 is fitted over the roof, as illustrated, and is secured by suitable retaining means such as the straps 42 which extend down inside of the tubular casting and are secured thereto. If desired, the same fastening means 43 which secures the straps 42 to the casting may also secure an adjacent end of the girder or rafter 21 to the center casting. The door may be protected by an inclined drip board 44.

In another section of the wall, there may be provided a delivery chute 45 arranged a suitable distance from the bottom of the bin whereby grain or other loose material stored within the bin may be delivered directly into means to transport the same. The opening 46 which leads to the chute may be closed by a slide 47 which may, if desired, be retained in position by guides 48, and if desired the opening 46 may be protected by a drip board 46ª.

Suitable ventilating means are provided for the interior of the bin, and in the embodiment disclosed in the drawings, there is shown a base having means to receive a plurality of vertical parallel perforated ventilating members. The base may be composed of a plurality of sockets 49, preferably one for each of the ventilating flues 50. Five of these flues 50 are disclosed in the drawings, but it is obvious that a greater or less number may be employed as the exigencies of the device require. The ventilating base is removably mounted within the bin and is adapted to rest upon the floor thereof. The sockets 49 of the base are preferably connected to each other by means such as the pipes 51, although the central socket may have an individual connection with a union 52 if desired. Extending from the union is a supply pipe 53 which is adapted to have an end 54 thereof extend beyond the wall of the bin for the purpose of connecting the same with any suitable means which will introduce a current of air to pass through the ventilating device and the ventilating flues 50, or through which may be passed suitable sterilizing fluids or fumes to kill any germs that may be present in the material that may be stored within the bin.

The sockets 49 may be of any preferred construction, but are shown provided with a lower chamber 55 having an opening 56 to permit fluid to pass from the chamber 55 into its flue 50 which is removably mounted within the socket. The flue may be perforated throughout its length, or may have the perforations at predetermined parts thereof only, as may be required to suit the conditions of the material to be stored within the bin. If desired, the interior of the flue may be provided with a deflector plate 57 which serves to disperse the fluid through the perforations of the flue and into the material stored, while the upper portion of the flue may serve as means to carry off the moisture laden air or gases from the material and direct the same to the exit in the top of the bin. It is preferred to have the upper ends of the flues 50 open to facilitate the exit of fluid from the bin, although it is obvious that this upper portion may be closed by moving the deflector to the top thereof, or other equivalent means. The upper part of the bin is provided with a suitable frame 58 which is suspended from the girders or rafters, and which serve to support the upper ends of the flues 50 in their vertical position. It is preferred to have the upper ends of the flues 50 terminate below the roof, whereby the door of the structure may be free to permit the circulation of air and its exit through the central casting 40 and beneath the protector plate 4.

It is obvious that various changes may be made in the details of construction of the parts and of the ventilating device to suit the requirements to which the structure may be placed, and the right is reserved to make such changes and alterations therein as fairly fall within the scope of the appended claims.

Having thus described my invention, what I claim as new and desire to secure by Letters Patent is:

1. A grain bin provided with a ventilating system comprising a plurality of ventilator receptacles, a common feed device for said receptacles, extending from the outside of the bin, and a plurality of vertical perforated flues supported within the bin and having each an end positioned in a ventilator receptacle.

2. A grain bin provided with a ventilating system comprising a plurality of ventilator receptacles, a common feed device for said receptacles extending from the outside of the bin, a plurality of vertical perforated flues supported within the bin and having each an end positioned in a ventilator receptacle and means associated with the roof of the bin to support the upper ends of said vertical flues.

3. The combination with a grain bin of a ventilating system therefor, comprising a plurality of perforated flues positioned within the bin, said flues terminating in socket members positioned on the floor of the bin, a plurality of imperforate pipes connecting said socket members to a supply pipe, a frame suspended from the roof of the bin to engage the flues and retain them in an upright position, and means to supply fluid to the flues and pipes from an external source.

4. The combination with a grain bin of a ventilating system therefor, comprising a plurality of perforated flues positioned within the bin, a plurality of socket members to receive the flues, pipes to connect the socket member to an external source of fluid supply, deflectors positioned within the flues to direct the incoming fluid through the perforations into the grain, and a protected aperture in the roof of the bin to permit the escape of said fluid.

5. A grain bin having a roof provided with an aperture, a ventilator positioned within the bin comprising a central flue and a plurality of flues, a removable ventilator base and socket members carried thereby to receive the flues, said central flue simultaneously engaging the ventilator base and the aperture in the roof of the bin to permit the escape of said fluid.

In testimony whereof I affix my signature in presence of two witnesses.

GEORGE F. BROWN.

Witnesses:
J. E. JENKS,
J. J. HICKS.